United States Patent
You et al.

(10) Patent No.: US 9,541,054 B2
(45) Date of Patent: Jan. 10, 2017

(54) FLOATING WAVE ENERGY CONVERTER WITH SEMI-SUBMERSBLE CHARACTERISTIC

(75) Inventors: Yage You, Guangzhou (CN); Songwei Sheng, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 405 days.

(21) Appl. No.: 14/345,202

(22) PCT Filed: May 24, 2012

(86) PCT No.: PCT/CN2012/076002
§ 371 (c)(1),
(2), (4) Date: Mar. 14, 2014

(87) PCT Pub. No.: WO2013/170496
PCT Pub. Date: Nov. 21, 2013

(65) Prior Publication Data
US 2014/0338321 A1    Nov. 20, 2014

(30) Foreign Application Priority Data
May 14, 2012 (CN) .......................... 2012 1 0148948

(51) Int. Cl.
*F03B 13/10* (2006.01)
*F03B 13/18* (2006.01)
(Continued)

(52) U.S. Cl.
CPC ............ *F03B 13/10* (2013.01); *B63B 35/44* (2013.01); *F03B 13/14* (2013.01); *F03B 13/189* (2013.01);
(Continued)

(58) Field of Classification Search
CPC B63B 21/66; F05B 2240/93; F05B 2240/932; F05B 2240/931; F03B 13/20
See application file for complete search history.

(56) References Cited

U.S. PATENT DOCUMENTS 4,580,400 A * 4/1986 Watabe ................. F03B 13/182
290/53
5,132,550 A * 7/1992 McCabe ................ B01D 61/10
290/42

(Continued)

FOREIGN PATENT DOCUMENTS

CN      101139969 A    3/2008
CN      201068839 Y    6/2008
(Continued)

OTHER PUBLICATIONS

International Search Report dated Feb. 28, 2013, issued in corresponding application No. PCT/CN2012/076002.

*Primary Examiner* — Audrey K Bradley
*Assistant Examiner* — Shafiq Mian
(74) *Attorney, Agent, or Firm* — Gokalp Bayramoglu (57) ABSTRACT

A floating eagle type wave power generating device includes an eagle-head-shaped wave absorption floating body, a ship-shaped underwater appendage and a door-shaped support arm. The eagle-head-shaped wave absorption floating body is fixedly connected with an upper end of the door-shaped support arm. A lower end of the door-shaped support arm is connected with first hinges. The first hinges are fixedly connected with the ship-shaped underwater appendage through a base. The door-shaped support arm, together with the eagle-head-shaped wave absorption floating body, can rotate around the first hinges. L-shaped underwater appendages, mounted at two ends of the ship-shaped underwater appendage, are connected with the ship-shaped underwater appendage through second hinges and can rotate around the (Continued)

second hinges. A main floating body is arranged above the ship-shaped underwater appendage and below the eagle-head-shaped wave absorption floating body. The ship-shaped underwater appendage is provided with buoyancy compartments and equipment compartments.

18 Claims, 4 Drawing Sheets

(51) Int. Cl.
    *B63B 35/44*     (2006.01)
    *F03B 13/14*     (2006.01)

(52) U.S. Cl.
    CPC .... *B63B 2035/4466* (2013.01); *F05B 2260/02* (2013.01); *F05B 2270/18* (2013.01); *Y02E 10/38* (2013.01)

(56) References Cited

U.S. PATENT DOCUMENTS

| | | | | |
|---|---|---|---|---|
| 7,726,911 B1* | 6/2010 | Dempster | ............... | B63B 35/44 114/256 |
| 8,093,736 B2* | 1/2012 | Raftery | ............... | F03B 13/1885 290/42 |
| 8,319,359 B2* | 11/2012 | Akervoll | ............ | F03B 13/1885 290/42 |
| 8,659,180 B2* | 2/2014 | Earl | ........................ | E02B 9/08 290/54 |
| 8,668,452 B2* | 3/2014 | Henriksen | ............... | B63B 21/50 415/7 |
| 8,784,653 B2* | 7/2014 | Murtha | ................ | B01D 24/042 210/170.11 |
| 9,151,267 B2* | 10/2015 | Hine | .................... | F03B 13/1885 |
| 9,429,135 B2* | 8/2016 | Lavelle | .................... | F03B 13/20 |
| 2004/0190999 A1* | 9/2004 | Wybro | .................... | B63B 9/065 405/203 |
| 2008/0018114 A1* | 1/2008 | Weldon | ................. | F03B 13/181 290/53 |
| 2009/0084296 A1* | 4/2009 | McCormick | ............ | F03B 13/20 114/26 |
| 2010/0140944 A1* | 6/2010 | Gardiner | ................ | F03B 13/16 290/53 |
| 2011/0068579 A1* | 3/2011 | Dullaway | ........... | F03B 13/1815 290/53 |
| 2011/0081259 A1* | 4/2011 | Vowles | ............... | F03B 13/1865 417/331 |
| 2011/0113771 A1* | 5/2011 | Foster | ................... | F03B 13/189 60/501 |
| 2012/0073290 A1 | 3/2012 | Lau | | |
| 2013/0009402 A1* | 1/2013 | Williams | ................ | F03B 13/182 290/53 |

FOREIGN PATENT DOCUMENTS

CN           101639028 A     2/2010
KR    10-2011-0115336 A    10/2011

\* cited by examiner

FLOATING WAVE ENERGY CONVERTER WITH SEMI-SUBMERSBLE CHARACTERISTIC

FIELD OF THE INVENTION

The present invention relates to the field of wave energy power generation, in particular to a novel floating eagle type wave power generating device with a semi-submersible characteristic.

BACKGROUND OF THE INVENTION

Given that oceans are rich in wave energy resources, how to effectively develop and utilize wave energy at low cost has become a task faced by the ocean wave energy researchers throughout the world. At present, the wave energy technology is still in the research stage all over the world, and there are various wave energy power generating devices that are being subjected to laboratory research or practical oceanic condition experiments. At present, there are plenty of technical problems hindering large-scale application of these wave energy devices: 1, the energy conversion efficiency is low: wave energy conversion is conducted by a first-stage/second-stage/third-stage conversion series system, and low conversion efficiency could be brought if there is a low efficiency at any of the stages. For example, poor efficiency of the air turbine of an oscillating water column could be generated due to violent change of the working condition; and poor efficiency of the linear motor in a point absorption wave energy device is generated since optimal load required by floats cannot be offered. 2, there is a quite strong randomness in wave energy: a number of devices fail to adapt to this intense variation in power, so the wave energy capture capability and the conversion efficiency are both degraded, besides, output instability is also caused. 3, the construction cost is high: the wave energy device is relatively large in weight, dimension and the quantity of materials and manpower for construction. In addition, an ocean wave energy device is normally constructed on land and then put into service in a working oceanic area. Typically, the location for construction is far from the working oceanic area, so engineering ships like crane ships, transport ships and semi-submersible barges are needed to transport and put the device into service, resulting in high construction expenditure. Only a very small part of the devices are suitable for direct long-distance towage by a tug at present. 4, the device is difficult to repair after being put into service, which brings difficulty in maintenance. The maintenance and repair problem always emerges during the operation process of a wave energy device. A wave energy device that is put into service in an oceanic area of large winds and waves is hardly repaired or maintained under practical oceanic conditions, so repair and maintenance of the device need to be carried out in a factory or port. Reclaiming of the device required by repair and maintenance in the factory or port, however, is much more difficult than putting the device into service. Thus, how to put the device into service and reclaim the device in a simple way is one of the prerequisites that ensure long-term running of the device. Therefore, improvement and development are still needed for the prior art.

SUMMARY OF THE INVENTION

An objective of the present invention is to provide a floating eagle type wave power generating device with a semi-submersible characteristic, intending to solve the problems in the current wave energy device, such as low efficiency, high construction and maintenance costs and high difficulty of maintenance and repair in factories after application.

The technical solution of the present invention is as follows:

A novel floating eagle type wave power generating device with a semi-submersible characteristic comprises an eagle-head-shaped wave absorption floating body, a ship-shaped underwater appendage and a door-shaped support arm, wherein the eagle-head-shaped wave absorption floating body is fixedly connected with the upper end of the door-shaped support arm, the lower end of the door-shaped support arm is connected with first hinges, the first hinges are fixedly connected with the ship-shaped underwater appendage through a base, the door-shaped support arm, together with the eagle-head-shaped wave absorption floating body, can rotate around the first hinge, L-shaped underwater appendages are mounted at the two ends of the ship-shaped underwater appendage, are connected with the ship-shaped underwater appendage through second hinges and can rotate around the second hinges, a main floating body is mounted right above the ship-shaped underwater appendage and below the eagle-head-shaped wave absorption floating body, pulleys are mounted on the deck of the ship-shaped underwater appendage below the eagle-head-shaped wave absorption floating body, one end of a steel cable passes through the corresponding pulley and is then fixedly connected with a corresponding lug on the eagle-head-shaped wave absorption floating body, the other end of the steel cable is fixedly connected with the top end of a piston rod of a corresponding hydraulic cylinder on the deck of the ship-shaped underwater appendage, and the ship-shaped underwater appendage is provided with buoyancy compartments and equipment compartments.

In the novel floating eagle type wave power generating device with a semi-submersible characteristic, the L-shaped underwater appendage comprises a horizontal platy structure and a vertical platy structure, and a floating tank and a ballast block are mounted on the horizontal platy structure.

In the novel floating eagle type wave power generating device with a semi-submersible characteristic, anchor lugs are fixedly mounted at the two sides of the front end of the ship-shaped underwater appendage, and limiting supports for preventing the L-shaped underwater appendages from moving inwards are fixedly mounted at the bottoms of the two ends of the ship-shaped underwater appendage.

In the novel floating eagle type wave power generating device with a semi-submersible characteristic, a tail vertical appendage in a platy structure, which is used for limiting horizontal oscillation of the entire device, is arranged on the deck of the ship-shaped underwater appendage, the tail vertical appendage is located on the deck and is supported by an inclined support rod, buoyancy adjustment compartments are mounted in the middle of two sides at the upper end of the deck of the ship-shaped underwater appendage and are supported on the deck by support pillars, air feeding/discharging pipe is mounted at the upper end of each buoyancy adjustment compartment, and a water feeding/discharging pipe is mounted at the lower end of the buoyancy adjustment compartment In the novel floating eagle type wave power generating device with a semi-submersible characteristic, the eagle-head-shaped wave absorption floating body has a hollow cavity structure internally, and has buoyancy enough for enabling the eagle-head-shaped wave absorption floating body to float on water surface in accordance with a set water level.

In the novel floating eagle type wave power generating device with a semi-submersible characteristic, an included angle between the door-shaped support arm and the horizontal line is set within a range from 30 degrees to 60 degrees under a still water floating condition.

In the novel floating eagle type wave power generating device with a semi-submersible characteristic, the section of the main floating body is in symmetrical distribution with respect to the transverse central line of the ship-shaped underwater appendage, wherein the front section arc of the section of the main floating body is an arc which takes the rotational center of the first hinge as center circle.

In the novel floating eagle type wave power generating device with a semi-submersible characteristic, the steel cable between the lug on the eagle-head-shaped wave absorption floating body and the pulley is perpendicular to a second connection line between the lug and the first hinge.

In the novel floating eagle type wave power generating device with a semi-submersible characteristic, a fixed buoyancy tank is mounted on the horizontal structure of the L-shaped underwater appendage and is provided with an air feeding/discharging pipe and a water feeding/discharging pipe.

In the novel floating eagle type wave power generating device with a semi-submersible characteristic, a propeller is mounted on the ship-shaped underwater appendage additionally.

The present invention has the beneficial effects below: 1. the wave power generating device in the present invention, which is imparted with a semi-submersible characteristic, can be integrally towed or voyage in ocean, the working mode can be initiated after the device submerges to a set depth during operation, the device is capable of converting wave energy into electric energy or energy in other forms, and in the event that the device needs to be repaired in a port or inspected on the sea, the device entirely floats up to the top of the deck so that technicians can give a maintenance to the device with the help of equipment on the ship. Use of the device in the present invention can remarkably reduce the construction, application and maintenance costs of an ocean wave energy device and achieve efficient, rapid and safe development and utilization of ocean wave energy. 2, the eagle-head-shaped wave absorption floating body is light in structure and small in weight and is shaped to reduce the weight of accompanying water, as a result, the eagle-head-shaped wave absorption floating body is superior in response to wide-range wave frequencies. 3, the ship-shaped underwater appendage and the L-shaped underwater appendages can meet the demands on device towage and efficient capture of wave energy.

DETAILED DESCRIPTION OF THE EMBODIMENTS

For better explicitness and clarity of the objective, technical solution and advantages of the present invention, further detailed description is made below to the present invention with reference to the embodiments and the drawings.

Figure 1:
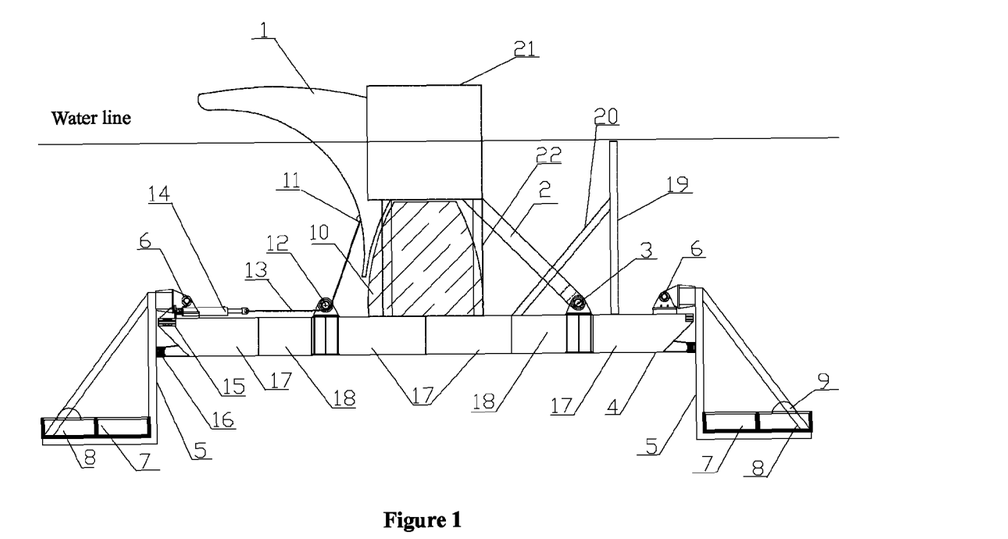
FIG. 1 is a side view of a novel floating eagle type wave power generating device with a semi-submersible characteristic in the present invention.
Figure 2:
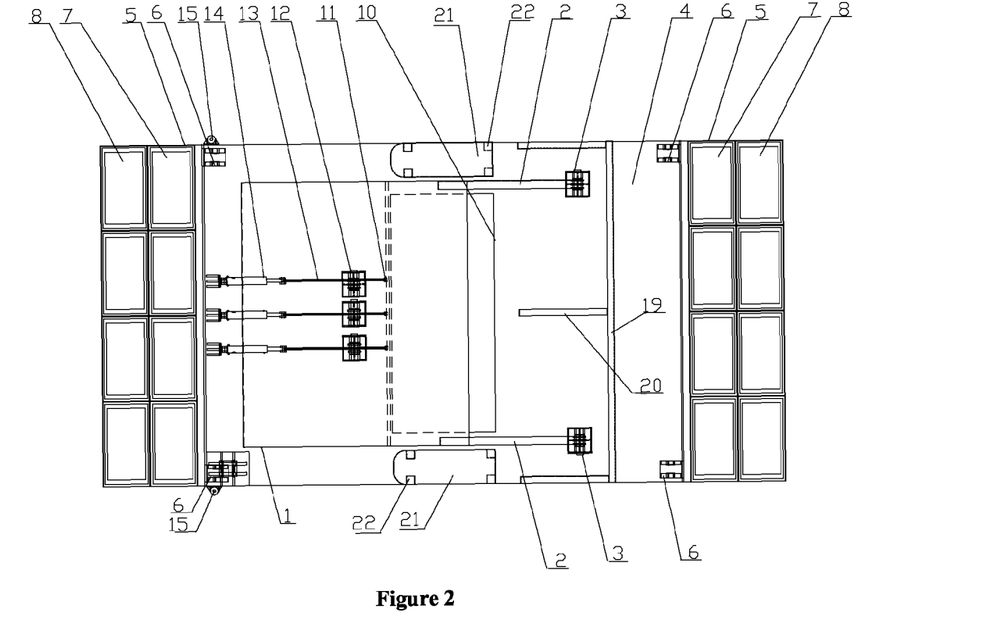
FIG. 2 is a top view of the novel floating eagle type wave power generating device with a semi-submersible characteristic in the present invention.

The specific structure of the present invention is as shown in FIG. 1 and FIG. 2 below. An eagle-head-shaped wave absorption floating body 1 which is specially designed in shape is fixedly connected with the upper end of a door-shaped support arm 2, the lower end of the door-shaped support arm 2 is connected with first hinges 3, the door-shaped support arm 2, together with the eagle-head-shaped wave absorption floating body 1, can rotate around the first hinges 3, the first hinges 3 are fixedly connected with a ship-shaped underwater appendage 4 through a base, L-shaped underwater appendages 5 are mounted at the two ends of the ship-shaped underwater appendage 4, are connected with the ship-shaped underwater appendage 4 through second hinges 6 and can rotate around the second hinges 6, floating tanks 7 and ballast blocks 8 are mounted on the horizontal platy structure of each L-shaped underwater appendage 5, buoyancy bags 9 are connected with the upper ends of the ballast blocks 8, a main floating body 10 which is specially designed in shape is mounted above the ship-shaped underwater appendage 4 and below the eagle-head-shaped wave absorption floating body 1, lugs 11 are mounted on the eagle-head-shaped wave absorption floating body 1, pulleys 12 are mounted on the upper part of the deck of the ship-shaped underwater appendage 4 below the eagle-head-shaped wave absorption floating body 1, one end of each steel cable 13 passes through the corresponding pulley 12 and is then fixedly connected with the corresponding lug 11, the other end of the steel cable 13 is fixedly connected with the top end of a piston rod of the corresponding hydraulic cylinder 14, anchor lugs 15 are fixedly mounted at the two sides of the front end of the ship-shaped underwater appendage 4, limiting supports 16 are fixedly mounted at the bottoms of the two ends of the ship-shaped underwater appendage 4, and the ship-shaped underwater appendage 4 is provided with buoyancy compartments 17 and equipment compartments 18. A tail vertical appendage 19 is arranged on the deck of the ship-shaped underwater appendage 4, is located on the deck and is supported by inclined support rods 20, buoyancy adjustment compartments 21 are mounted in the middle of two sides at the upper end of the deck of the ship-shaped underwater appendage 4, and the buoyancy adjustment compartments 21 are supported on the deck by support pillars 22.

The hydraulic cylinders 14 are mounted on the deck of the ship-shaped underwater appendage, however, mounting thereof is not limited to this way; mounting of the hydraulic cylinders 14 can be achieved in such a manner that one end of the hydraulic cylinders is directly hinged to the ship bottom while the other end is directly hinged to the eagle-head-shaped wave absorption floating body.

Figure 3:
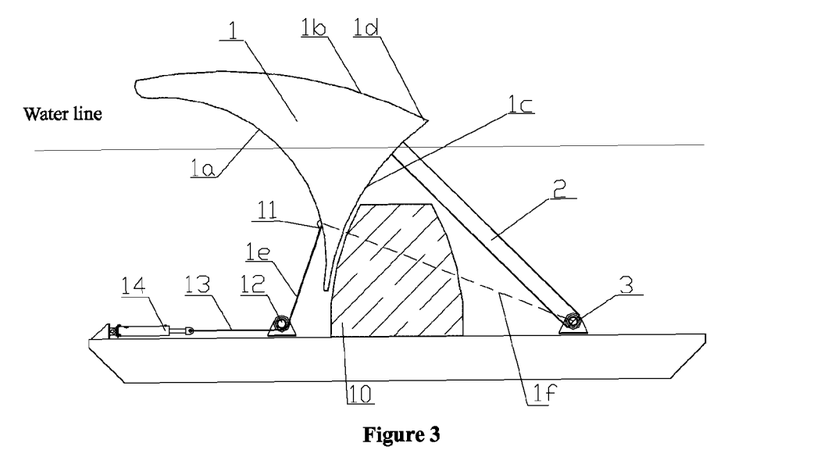
FIG. 3 is a partial schematic diagram of FIG. 1.
Figure 4:
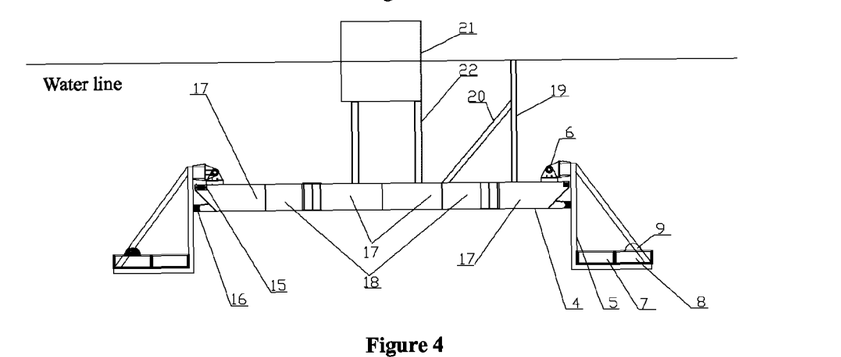
FIG. 4 is a partial schematic diagram of FIG. 1.

For clear description of the functions and design essentials of various components in the device of the present invention, introduction is now given with reference to FIG. 3 and FIG. 4 respectively: as shown in FIG. 3, the eaglehead-shaped wave absorption floating body 1 has a specially-designed sectional contour, which is mainly comprises a first arc 1a, a second arc 1b and a third arc 1c, wherein the first arc 1a is a wave-facing plane curve with the front end stretching beyond waterline and keeping a particular arc length above waterline, another end stretching downwards and the distal end being closer to the deck of the ship-shaped underwater appendage 4, that is, the first arc 1a is deep in draft, the third arc 1c takes the rotational center of the first hinge 3 as circle center and the length of the support arm 2 as radius R1, an intersection point 1d of the upper endpoint of the third arc 1c and the second arc 1b is above normal waterline under a still water floating condition, the lower end of the third arc 1c stretches downwards, the distal end of the third arc is closer to the deck of the ship-shaped underwater appendage 4, that is to say, the third arc 1c is deep in draft as well, besides, the distal endpoints of the first and second arcs 1a and 1b are kept on the same horizontal line under a still water floating condition and are close to each other. The eagle-head-shaped wave absorption floating body 1 has a hollow cavity structure internally, buoyancy increases by air feeding and water discharging in the hollow cavity or decreases by air discharging and water feeding in the hollow cavity, and the designed condition of the device can be precisely reached by means of buoyancy adjustment when the device is put into service in water. The eagle-head-shaped wave absorption floating body 1 may also be internally filled with a light material, thereby guaranteeing floatation of the eagle-head-shaped wave absorption floating body based on designed waterline. An included angle between the support arm 2 and the horizontal line under a still water floating condition is set within a range from 30 degrees to 60 degrees, normally 45 degrees, and such an angle design could result in maximal matching between the device and the wave motion characteristics. The section of the main floating body 10 is in symmetrical distribution with respect to the transverse central line of the ship-shaped underwater appendage 4, wherein the front section arc of the section of the main floating body 10 similarly takes the rotational center of the first hinge 3 as center circle and has a radius R2 slightly smaller than R1, the transverse width of the main floating body 10 is smaller than the width between the two rods of the door-shaped support arm 2, the main floating body 10 is a fixed buoyancy compartment that provides a buoyancy basically equal to the weight of the device, the eagle-head-shaped wave absorption floating body 1 excluded, in water. A first connection line 1e between the lug 11 and the pulley 12 is perpendicular to a second connection line 1f between the lug 11 and the first hinge 3, which can result in maximal linear displacement of the steel cable 13, and stroke of the hydraulic cylinder 14 needs to be long enough or a plurality of hydraulic cylinders are serially connected.

In order that total stroke of the hydraulic cylinder(s) meets the demand on motion distance, furthermore, the hydraulic cylinder 14 may also be directly arranged along the first connection line 1e in case of adequate space distance, that is to say, one end of the hydraulic cylinder is hinged to the cabin or the deck while the other end is connected with the lug 11 on the eagle-head-shaped wave absorption floating body 1 along the connection line 1e directly or via a steel rope. In the case of adopting the solution that one end of the hydraulic cylinder 14 is hinged to the ship-shaped underwater appendage 4 while the other end is hinged to the eagle-head-shaped wave absorption floating body 1, a connection line between the two hinging points is perpendicular to the connection line between the lug 11 and the first hinge 3. The ship-shaped underwater appendage 4 is in the shape similar to a square barge, whether a voyage propeller is additionally mounted can be determined in light of the service conditions, and the front end and the rear end of the ship-shaped underwater appendage 4 are both inclined to reduce resistance during towage or voyage.

As shown in FIG. 4, the L-shaped underwater appendages 5 are mounted at the two sides of the ship-shaped underwater appendage 4 through the second hinges 6, longer horizontal and vertical structures of the L-shaped underwater appendages 5 are advantageous for device stability, fixed buoyancy tanks 7 are mounted on the horizontal structures of the L-shaped underwater appendages 5 and are provided with air feeding/discharging pipes and water feeding/discharging pipes that can be used for controlling the buoyancy inside the fixed buoyancy tanks 7, the buoyancy increases by air feeding and water discharging in the fixed buoyancy tanks 7 or decreases by air discharging and water feeding in the fixed buoyancy tanks 7, ballast blocks 8 may be arranged at the outer side of the horizontal structure of the L-shaped underwater appendage 5 and are connected with a buoyancy bags 9, each buoyancy bag 9 is provided with an air feeding/discharging pipe and a rope, and by feeding air into or discharging air out of the buoyancy bags 9, the ballast blocks 8 can float up from below under the guidance of the rope or fall onto preset mounting locations from water surface. The anchor lugs 15 for tying a mooring system are arranged at the two sides of the front end of the ship-shaped underwater appendage 4, the limiting supports 16 are arranged at the four corners of the bottom of the ship-shaped underwater appendage 4 and used for preventing the L-shaped underwater appendages 5 from moving inwards, the size and number of the buoyancy compartments 17 and the equipment compartments 18 arranged in the ship-shaped underwater appendage 4 can be determined based on actual needs, and each of the buoyancy compartments 17 is provided with an air feeding/discharging pipe and a water feeding/discharging pipe that can be used for controlling the buoyancy inside the buoyancy compartments 17. The tail vertical appendage 19 in a platy structure arranged on the deck of the ship-shaped underwater appendage 4 plays a role of limiting horizontal oscillation of the device and is reinforced by the inclined support rods 20, the buoyancy adjustment compartments 21 are mounted in the middle of two sides at the upper end of the deck of the ship-shaped underwater appendage 4, the volumes of the buoyancy adjustment compartments 21 are partially under water and partially above water under a normal state, an air feeding/discharging pipe is mounted at the upper end of the corresponding buoyancy adjustment compartment 21, a water feeding/discharging pipe is mounted at the lower end of the corresponding buoyancy adjustment compartment 21, buoyancy increases by air feeding and water discharging and decreases by air discharging and water feeding, thus adjustment for the floating condition of the device can be realized, and the buoyancy adjustment compartments are supported on the deck by support pillars 22.

Figure 5:
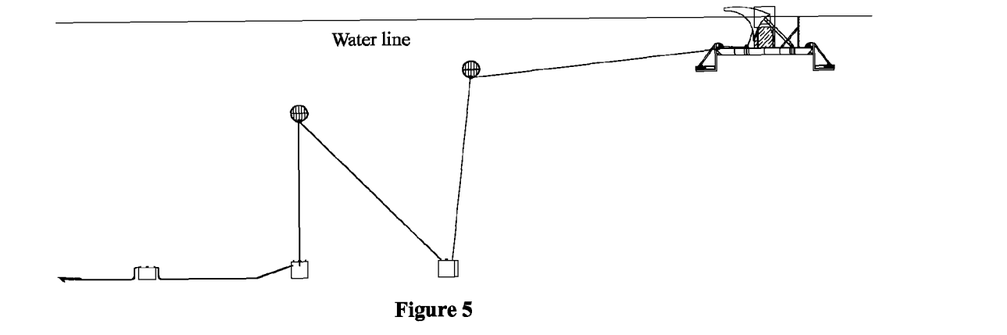
FIG. 5 is a reference diagram of the service state of the present invention.

The device in the present invention, a floating-type wave energy device, operates in ocean under a state as shown in FIG. 5: the state of the device as shown in the figure is a normal working state, most part of the device is immersed in water, the buoyancy compartments 17 in the ship-shaped underwater appendage 4 are all filled with water, the fixed buoyancy tanks 7 mounted on the horizontal structures of the L-shaped underwater appendages 5 are all filled with water, air is discharged out of all the structural part cavities in the device except the eagle-head-shaped wave absorption floating body 1, the main floating body 10 and the buoyancy adjustment compartments 21, the main floating body 10 substantially bears the total weight of the device in water, the posture of the eagle-head-shaped wave absorption floating body 1 is adjusted by a floating cavity in the eagle-head-shaped wave absorption floating body 1, and the overall floating condition of the device is adjusted by the buoyancy adjustment compartments 21. Only partial volumes of the eagle-head-shaped wave absorption floating body 1 and the buoyancy adjustment compartments 21 are above water surface after the device is finally adjusted to reach an accurate state, and the height of the device above water surface is based on by the fact that the intersection point 1$d$ of the two arcs at the tail of the eagle-head-shaped wave absorption floating body 1 is above water surface and there is no leftward/rightward or backward/frontward inclination of the device. The anchor lugs 15 at the two sides of the front end of the ship-shaped underwater appendage are used for tying a mooring system, and the mooring system of the device in the present invention, with the capacity of energy storage, is arranged in a way as shown in FIG. 5.

The working principle of the wave energy device in the present invention is as follows: the eagle-head-shaped wave absorption floating body 1 performs reciprocating rotation around the first hinges 3 via the door-shaped support arm 2 under the action of waves, the eagle-head-shaped wave absorption floating body 1 is pushed by waves to rotate upwards around the first hinges 3 in the process of wave change from valley to crest, meanwhile, the steel cables 13 are pulled by the eagle-head-shaped wave absorption floating body 1 to move upwards and then bypass the pulleys 12 to pull the piston rod of the hydraulic cylinders 14 to move outwards, and hydraulic oil in the rod cavities of the hydraulic cylinders 14 enters an energy accumulator by extrusion for power generation or for work in other forms; in the process of wave change from crest to valley, the eagle-head-shaped wave absorption floating body 1, which is no longer pushed by waves, rotates downwards around the first hinges 3 under the action of gravity, the upward traction force is no longer present on the steel cables 13, the piston rods of the hydraulic cylinders 14 restore under the effect of an external force and hydraulic oil is supplied to the rod cavities, thus completing a good preparation for the next upward rotational work of the eagle-head-shaped wave absorption floating body 1 pushed by waves, the restoration force for the piston rods of the hydraulic cylinders 14 may be offered by a pressure oil tank or in other ways, a group of hydraulic cylinders can be mounted additionally at the rear half part of the device according to the mounting way of the hydraulic cylinders 14 if the device is required to finish reciprocating bidirectional work, as a result, this bidirectional work is achieved, that is to say, the eagle-head-shaped wave absorption floating body 1 works for upward and downward rotations, the energy conversion mechanism of the device in the present invention, i.e. the hydraulic cylinders 14, may also be replaced by other energy conversion mechanisms, such as linear motors, and the power required for energy conversion of the energy conversion mechanism is always provided by the eagle-head-shaped wave absorption floating body 1 no matter which energy conversion element is used, so that the energy conversion element in the present invention is not limited to a hydraulic cylinder only. In addition to the fact that the eagle-head-shaped wave absorption floating body 1 in the device is allowed to do reciprocating rotation motion around the first hinges 3 via the door-shaped support arm 2, other motions that reduce the capture amount of wave energy are also effectively prohibited in the energy conversion process, and the ship-shaped underwater appendage 4, the L-shaped underwater appendages 5 and the tail vertical underwater appendage 19 in the present invention play the roles of stabilizing the state of the device and preventing the device from overall high-frequency heaving, surging and pitching.

A single point mooring solution is employed for the device in the present invention, which favors automatic alignment of the device with wave direction.

Figure 6:
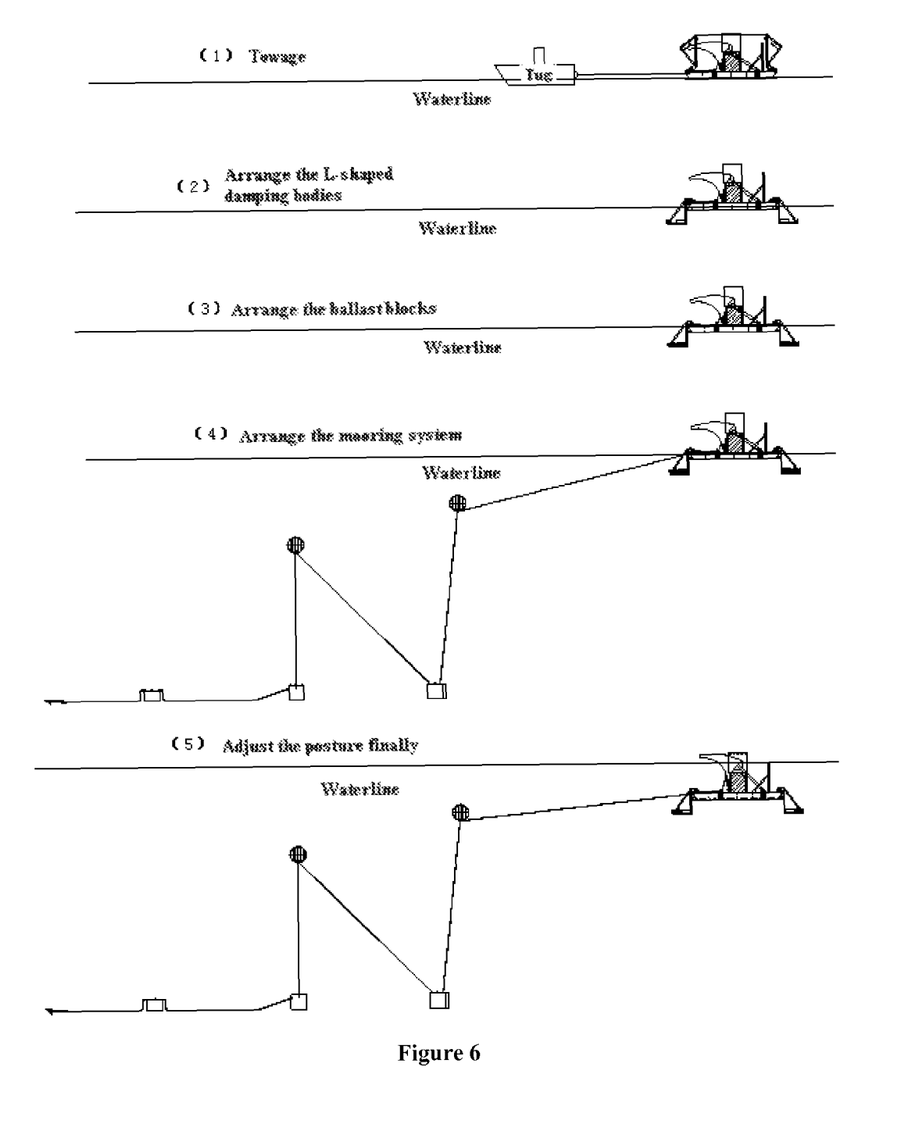
FIG. 6 is a diagram of the steps of putting the power generating device of the present invention into service.

The wave energy device in the present invention is put into service as shown in FIG. 6: before the device is put into service, mooring components, ballast blocks 8 and other components are arranged on the ship-shaped underwater appendage 4, the L-shaped underwater appendages 5 rotate upwards to be above the deck surface of the ship-shaped underwater appendage 4 and is then fixed, the eagle-head-shaped wave absorption floating body 1 rotates downwards to fall onto the deck surface, so the device is integrally similar to a transport barge floating on the water surface. The device in the present invention is towed by a tug to a location where the device is about to be put into service, after that, the L-shaped underwater appendages 5 at the two ends are dropped down at first and the ballast blocks 8 are then placed at the set locations, a mooring system is arranged and then the device submerges integrally by discharging air out of and feeding water into the buoyancy compartments 17 on the ship-shaped underwater appendage 4, and finally, the posture of the device is adjusted according to the designed state so that the device is already put into service.

Figure 7:
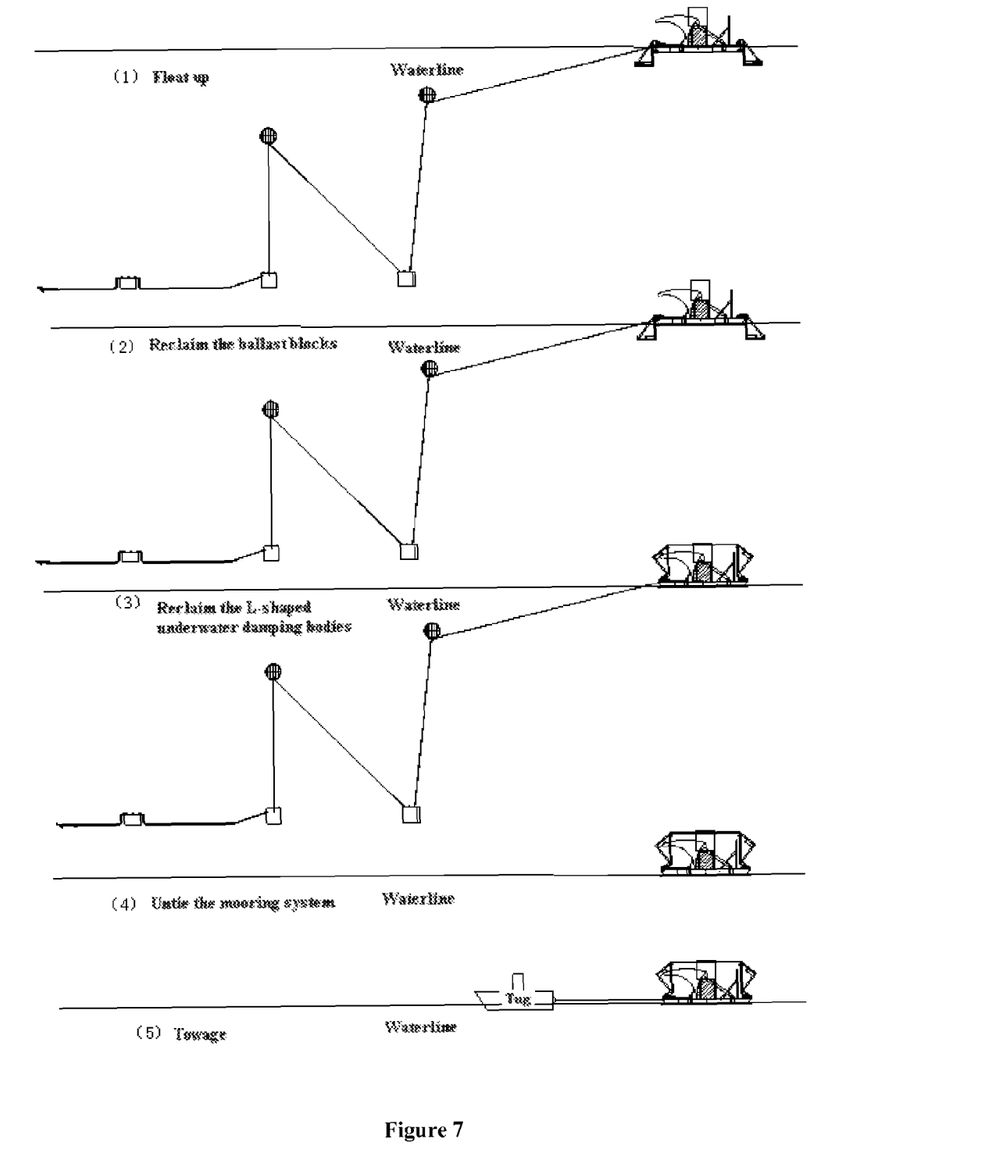
FIG. 7 is a diagram of the steps of reclaiming the power generating device of the present invention.

The wave energy device in the present invention is reclaimed as shown in FIG. 7: in the case that the device needs to be put into service in a new oceanic area or repaired in a factory, first of all, air and water need to be fed into and discharged out of the buoyancy compartments 17 on the ship-shaped underwater appendage 4 respectively so that the device floats up integrally, the ship-shaped underwater appendage 4 surfaces, air is then fed into the buoyancy bags 9, the ballast blocks 8 surface under the pulling of buoyancy from the buoyancy bags 9 and are taken back to the ship by towlines, afterwards, air is fed into the floating tanks 7 of the L-shaped underwater appendages 5 so that the L-shaped underwater appendages rotate to be above the water surface and then is pulled away from the water surface by the towlines and fixed on the ship-shaped underwater appendage. Then, the mooring system is untied, at this moment, the device is similar to a tow-able barge, which is then towed to the new put-into-service location or the factory by a tug.

It shall be noted that, if a propeller is mounted additionally on the ship-shaped underwater appendage 4, the self-propelled function can be achieved and the problem of power in the put-into-service and reclaiming processes can be solved by the device itself; furthermore, if the ship-shaped underwater appendage 4 has a narrow front end and a wide rear end and accordingly looks like a trapezoid when being seen from top, automatic alignment of the device with wave direction can be favored better.

Compared with conventional wave energy devices, the device in the present invention has the advantages that 1, shape design for the wave absorption floating body is excellent, the eagle-head-shaped wave absorption floating body 1 is changed into a cut-off floating body by special design for its sectional contour, thus, the wave energy conversion capability is strong and there is essentially no energy loss owing to no wave generation at the tail; moreover, the eagle-head-shaped wave absorption floating body is small in own weight and also in weight of the accompanying water caused by its shape, thus, the wave absorption floating body has a good response to waves within a quite large frequency range and also has superior wave energy capture capability. 2, the motion displacement of the wave absorption floating body is specially designed, the included angle between the support arm 2 and the horizontal line under a still water floating condition is approximately 45 degrees, which can result in maximal matching between the device and the wave motion characteristics, thus, the conversion capability is strong. 3, special design is applied to arrangement of the traction steel cable 13 for pulling the hydraulic cylinder 14 to work, the connection line 1f between the lug 11 and the first hinge 3 is perpendicular to the connection line 1e between the lug 11 and the pulley 12, which can result in maximal linear displacement of the steel cable 13. 4, adjustment for the floating condition of the device is simple and easy to implement, wherein the buoyancy from the main floating body 10 bears the total weight of the device in water essentially, only self-adjustment for the floating condition of the eagle-head-shaped wave absorption floating body 1 and micro-adjustment for the overall floating condition of the device by the buoyancy adjustment compartment 21 need to be completed. 5, the rotatable L-shaped underwater appendages 5 and the floating tanks 7 thereon, as well as the detachable ballast blocks 8 achieve the function that the L-shaped underwater appendages 5 are rotated to get on the ship and dropped downwards easily. 6, the ship-shaped underwater appendage 4 is designed in light of ship shape and is capable of bearing all equipment and structures of the device in the present invention, including the mooring system, and the ship-shaped underwater appendage 4 is small in water resistance and good in stability during towage and voyage in ocean. The ship-shaped underwater appendage 4 is capable of completely meeting the demand on long-distance towage, and the device can be put into service or reclaimed without a floating crane or a floating dock, thereby lowering the put-into-service and reclaiming costs remarkably.

The light eagle-head-shaped wave absorption floating body, which is specially designed in shape, is used for absorbing waves maximally to minimize backward wave generation, and the motion track of the floating body is fundamentally matched with the motion of waves; used in the device as the second-stage energy conversion system is a hydraulic conversion system that has an energy storage link, the device generates power interruptedly in the case of small waves, that is, energy is accumulated in the device in a progressive way and centralized power generation is conducted when the energy accumulated reaches the upper limit value; the device generates power continuously in the case of large waves; the device is provided with the horizontal underwater appendage and the L-shaped underwater appendages, the horizontal underwater appendage having a flat-bottom ship-shaped structure is capable of not only preventing the device from heaving, but also serving as a carrier for the device during ocean towage; the L-shaped underwater appendages mounted at the two sides of the ship-shaped horizontal damping plate each have a rotatable structure, are downwards perpendicular to ocean bottom while the device operates and can be upwards turned over to be carried on the ship-shaped horizontal underwater appendage while the device is under transportation. The device exists in ocean in the form of single point mooring, which is favorable for automatic alignment of the device with wave direction. In conclusion, the device in the present invention is advantageous in overcoming the low-efficiency defect of floating-type wave energy and capable of satisfying stable power generation, and is favorable for batch production and reduction in production cost, reduction in investment and maintenance costs, improvement in typhoon resistance, and prolongation in working life.

It shall be understood that the use of the present invention is not limited to the examples mentioned above, improvements or variations could be made to the aforementioned description by those ordinary skilled in this art, and all these improvements or variations shall fall within the scope of the appended claims in the present invention.

We claim:

1. A floating wave energy converter comprising:
    a wave absorbing floating body having a lug;
    a first underwater appendage, having a deck, a buoyancy compartment, and an equipment compartment, wherein the first under water appendage is coupled to the wave absorbing floating body through the lug, a pulley, a steel cable, and a hydraulic cylinder;
    a support arm wherein an upper end of the support arm is fixedly coupled to the wave absorbing floating body, wherein a lower end of the support arm is coupled to a first hinge, wherein the first hinge is fixedly coupled to the first underwater appendage through a base, and wherein the support arm, together with the wave absorbing floating body, can pivot about the first hinge;
    a main floating body, located above the first underwater appendage and below the wave absorbing floating body; and
    a plurality of second underwater appendages, wherein each of the plurality of second underwater appendages is pivotably coupled to an end of the first underwater appendage through a second hinge.

2. The floating wave energy converter according to claim 1,
    wherein the wave absorbing floating body has a sectional contour including a first arc, a second arc and a third arc;
    wherein the first arc is an apron slope curve with a first end extending beyond a waterline, and another end extending downwards toward the deck of the first underwater appendage;
    wherein the third arc takes a rotational point of the first hinge as a center and a length of the support arm as a radius, wherein an intersection point of an upper end of the third arc and the second arc is above the waterline under a still water floating condition, wherein a lower end of the third arc extends downwards toward the deck of the first underwater appendage.

3. The floating wave energy converter according to claim 1, wherein the first underwater appendage is in a shape of a flat-bottom square barge.

4. The floating wave energy converter according to claim 1,
    wherein one end of the hydraulic cylinder is hinged to the first underwater appendage while another end is connected to the wave absorbing floating body, and wherein a connection line of the two hinging points is perpendicular to a connection line between the lug and the first hinge.

5. The floating wave energy converter according to claim 1,
    wherein a section of the main floating body is symmetrical with respect to a transverse central line of the first underwater appendage,
    wherein a front section arc of the section of the main floating body is an arc which takes the rotational center of the first hinge as a center and which has a radius smaller than the length of the support arm, and a width of the main floating body being smaller than a width between two support arms.

6. The floating wave energy converter according to claim 1,
wherein the buoyancy compartment is located in a middle of the deck of the first underwater appendage, the volume of the buoyancy compartment being partially under water and partially above water under a normal state;
wherein the buoyancy compartment further includes an air feeding/discharging pipe and a water feeding/discharging pipe, wherein the air feeding/discharging pipe is mounted at an upper end of the buoyancy compartment, and wherein the water feeding/discharging pipe is mounted at a lower end of the buoyancy compartment.

7. The floating wave energy converter according to claim 1, wherein the second underwater appendage further includes:
a horizontal plate structure;
a vertical plate structure;
a floating tank and a ballast block, mounted on the horizontal plate structure; and
a buoyancy bag, coupled to an upper end of the ballast block, wherein the buoyancy bag is provided with an air feeding/discharging pipe and a rope.

8. The floating wave energy converter according to claim 1, wherein the first underwater appendage further includes:
a plurality of anchor lugs, which is fixedly mounted at two sides of first underwater appendage, and
a position-limiting supports, fixedly mounted at an end of a bottom of the first underwater appendage, wherein the position-limiting support is used for preventing the second underwater appendage from moving inwards.

9. The floating wave energy converter according to claim 1, wherein the first underwater appendage further includes a vertical tail appendage, which is of a plate structure and is arranged on the deck of the first underwater appendage, wherein the vertical tail appendage is used to limit a horizontal oscillation of the wave energy converter.

10. The floating wave energy converter according to claim 9, wherein the hydraulic cylinder is hinged between a back part of the wave absorbing floating body and the vertical tail appendage.

11. The floating wave energy converter according to claim 1, wherein the wave absorbing floating body has a hollow cavity structure internally.

12. The floating wave energy converter according to claim 1, wherein an included angle between the support arm and a horizontal line is within a range from 30 degrees to 60 degrees under a still water floating condition.

13. The floating wave energy converter according to claim 1, wherein the second underwater appendage further includes a horizontal structure and a fixed buoyancy tank, wherein the fixed buoyancy tank is located on the horizontal structure and wherein the fixed buoyancy tank is provided with an air feeding/discharging pipe and a water feeding/discharging pipe.

14. The floating wave energy converter according to claim 1, wherein the first underwater appendage further includes a propeller.

15. The floating wave energy converter according to claim 1, the wave absorbing floating body is internally filled with a material guaranteeing floatation of the wave absorbing floating body.

16. The floating wave energy converter according to claim 1,
wherein the buoyancy compartment is located at a corner of the deck, the volume of the buoyancy compartment being partially under water and partially above water under a normal state,
wherein the buoyancy compartment includes an air feeding/discharging pipe and a water feeding/discharging pipe, wherein the air feeding/discharging pipe is located at an upper end of the buoyancy compartment, and wherein the water feeding/discharging pipe is located at a lower end of the buoyancy adjustment compartment.

17. The floating wave energy converter according to claim 1, wherein the pulley is mounted on a deck of the first underwater appendage; wherein the hydraulic cylinder is located on the deck of the first underwater appendage, and includes a piston rod; wherein the steel cable passes through the pulley, one end of the steel cable being fixedly connected to the lug on the wave absorbing floating body, and the other end of the steel cable being fixedly connected to a top end of the piston rod of the hydraulic cylinder.

18. The floating wave energy converter according to claim 17, wherein the steel cable between the lug on the wave absorbing floating body and the pulley is perpendicular to a connecting line of the lug and the first hinge.

* * * * *